(12) United States Patent
Bakre

(10) Patent No.: US 7,728,525 B2
(45) Date of Patent: Jun. 1, 2010

(54) RELAMPING CIRCUIT FOR BATTERY POWERED BALLAST

(75) Inventor: Shashank S. Bakre, Woburn, MA (US)

(73) Assignee: Osram Sylvania Inc., Danvers, MA (US)

( * ) Notice: Subject to any disclaimer, the term of this patent is extended or adjusted under 35 U.S.C. 154(b) by 555 days.

(21) Appl. No.: 11/829,328

(22) Filed: Jul. 27, 2007

(65) Prior Publication Data

US 2009/0026960 A1    Jan. 29, 2009

(51) Int. Cl.
*H05B 37/00* (2006.01)

(52) U.S. Cl. .................... 315/86; 315/209 R; 315/226

(58) Field of Classification Search ............... 315/86, 315/119, 123, 127, 128, 160, 161, 209 R, 315/225, 226, 312–315, 360, 362
See application file for complete search history.

(56) References Cited

U.S. PATENT DOCUMENTS

| | | | |
|---|---|---|---|
| 4,977,351 A * | 12/1990 | Bavaro et al. ............... | 315/87 |
| 5,854,538 A | 12/1998 | Krummel | |
| 5,986,407 A * | 11/1999 | Chang ........................ | 315/86 |
| 6,140,771 A | 10/2000 | Luger et al. | |
| 6,339,296 B1 | 1/2002 | Goral | |
| 6,366,031 B2 | 4/2002 | Klien | |
| 6,628,083 B2 * | 9/2003 | Pickering ..................... | 315/86 |
| 6,972,531 B2 | 12/2005 | Krummel | |
| 7,084,579 B2 | 8/2006 | Konopka et al. | |
| 7,187,132 B2 | 3/2007 | Bakre | |
| 7,218,063 B2 | 5/2007 | Konopka et al. | |

* cited by examiner

*Primary Examiner*—Douglas W Owens
*Assistant Examiner*—Jimmy T Vu
(74) *Attorney, Agent, or Firm*—Frank R. Agovino; Shaun P. Montana

(57) ABSTRACT

A ballast (e.g. a fluorescent light ballast) includes a primary ballast for powering the lamp from a power supply (e.g., utility line power) and an battery powered ballast for powering the lamp from a battery when the primary power supply is not energized by the power supply. When power supply power is restored to the ballast, the ballast shuts down the battery powered ballast and a switch circuit operably connects the lamp to the primary ballast. The ballast toggles the switch circuit such that the primary ballast detects replacement of a lamp and resets any fault detection or protection circuits (e.g., an end of lamp life circuit) that may have been triggered during the transition from battery power to power from the power supply.

21 Claims, 4 Drawing Sheets

RELAMPING CIRCUIT FOR BATTERY POWERED BALLAST

BACKGROUND

A ballast provides power to a lamp and regulates the current and/or power provided to the lamp. When a lamp (e.g. a fluorescent lamp) nears the end of its usable life or breaks, the resistance of the lamp increases as seen by the ballast. The increased resistance requires the ballast to output higher voltages in order to maintain the current or power transferred to the lamp. Thus, the ballast develops very high voltages (e.g., voltages in excess of 500 volts AC) as the resistance continues to increase. The high voltage poses an electrocution hazard to a technician who needs to replace the old lamp because the increased voltage increases the risk that the electricity will arc to earth ground through the technician as he attempts to replace the lamp. Therefore, some ballasts are equipped with a protection circuit (e.g., an end of lamp life circuit) that detects output voltages in excess of a threshold and shuts down the high voltage output of the ballast. These ballasts also have a circuit for detecting when a lamp has been replaced and restarting the high voltage output of the ballast in order to light the new lamp (e.g., by resetting the end of lamp life circuit).

A ballast may receive power from multiple sources. For example, ballasts used in commercial buildings commonly receive power from a utility line supply and from a battery. Such ballasts include a primary ballast for powering a lamp from the utility line supply and an battery powered ballast for powering the lamp from the battery. The primary ballast is configured to power two lamps in a single fixture while the battery powered ballast is configured to only power one of the lamps. Generally, the primary ballast is providing power to both lamps whenever utility line power is available to the ballast and the light is switched on, and the battery powered ballast powers one lamp from the battery when the light is switched on but there is no utility line power available to the ballast such as during a fire or utility power outage.

A problem can occur in these existing ballasts when switching power sources, for example, when switching from battery power to utility line power after an interruption in utility line power to the ballast. That is, when utility line power is restored to the ballast, the ballast switches operation from the battery powered ballast to the primary ballast by shutting down the battery powered ballast and reconfiguring the connection between the ballast and the lamps such that the lamps can be powered by the primary ballast instead of the battery powered ballast. However, due to timing delays in the primary and battery powered ballasts, the primary ballast may fail to properly power to the lamps due to timing delays in the primary and battery powered ballasts. That is, due to timing delays or rebound action in the switches that reconfigure the lamp to ballast connection, the end of lamp life circuit of the primary ballast may erroneously detect that the lamps are broken or end the end of their useful lives and shut down the output of the primary ballast. These timing delays may also cause other protection circuits to trigger.

To overcome these timing delays, one prior art solution disclosed in U.S. Pat. No. 6,339,296 is to delay supplying power from the utility line to the primary ballast for a period of 5 to 10 seconds in order to allow adequate time for the switches that determine the lamp to ballast connection to reconfigure the connection and other transients in the ballast to settle. Thus, when the primary ballast receives power, the end of lamp life circuit (and other protection circuits) is not falsely triggered because the lamps have been connected to the primary ballast output for a number of seconds. One problem with this solution is that delaying power to the primary ballast introduces a relatively long wait time when switching between power sources (e.g. when switching from battery power to utility line power).

SUMMARY

In one embodiment of the invention, a ballast having a relamping circuit includes a primary ballast for supplying power to a lamp from a power supply (e.g. utility line power), and an battery powered ballast for supplying power to a lamp from a battery. When power from the power supply is restored to the ballast after an interruption, the ballast provides the power from the power supply to the primary ballast, de-energizes a lamp driver circuit of the battery powered ballast, and reconfigures the connection between the ballast and the lamp so that the lamp is operably connected to the primary ballast. A relamping circuit of the battery powered ballast then toggles a switch circuit that determines the connection configuration between the lamp and the ballast to disconnect the lamp from the primary ballast and then reconnect the lamp to the primary ballast. In operation, a protection circuit (e.g., an end of lamp life circuit) of the primary ballast detects that a lamp has been replaced, and the protection circuit resets, enabling an inverter of the primary ballast to supply power to the lamp from the power supply.

In another embodiment of the invention, a method is provided for transitioning a lamp from power from a battery to power from a power supply in response to a power restoration event. The power restoration event occurs when the power supply energizes the primary ballast following a period during which the power supply was not energizing the power supply. The transition is preformed by a ballast including a primary ballast for powering the lamp from the power supply when the primary ballast is energized by the power supply and an battery powered ballast for powering the lamp from a battery when the primary power supply is not energized by the power supply. In response to the power restoration event, the ballast disables a lamp driver circuit of the battery powered ballast and actuates a switch circuit of the battery powered ballast. The switch circuit has a first state in which the lamp is operably connected to the battery powered ballast, and a second state in which the lamp is operably connected to the primary ballast. In response to the power restoration event, the switch circuit is actuated to the second state so that the primary ballast, when energized by the power supply, can provide power from the power supply to the lamp. The ballast toggles the switch circuit between the second state and the first state in response to the power restoration event. That is, the ballast places the switch circuit in the first state, and then returns the switch circuit to the second state. In one embodiment, toggling the switch circuit causes a protection circuit (e.g., an end of lamp life circuit) in the primary ballast to detect a lamp replacement which in turn causes the protection circuit to reset so that the primary ballast provides power to the lamp.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
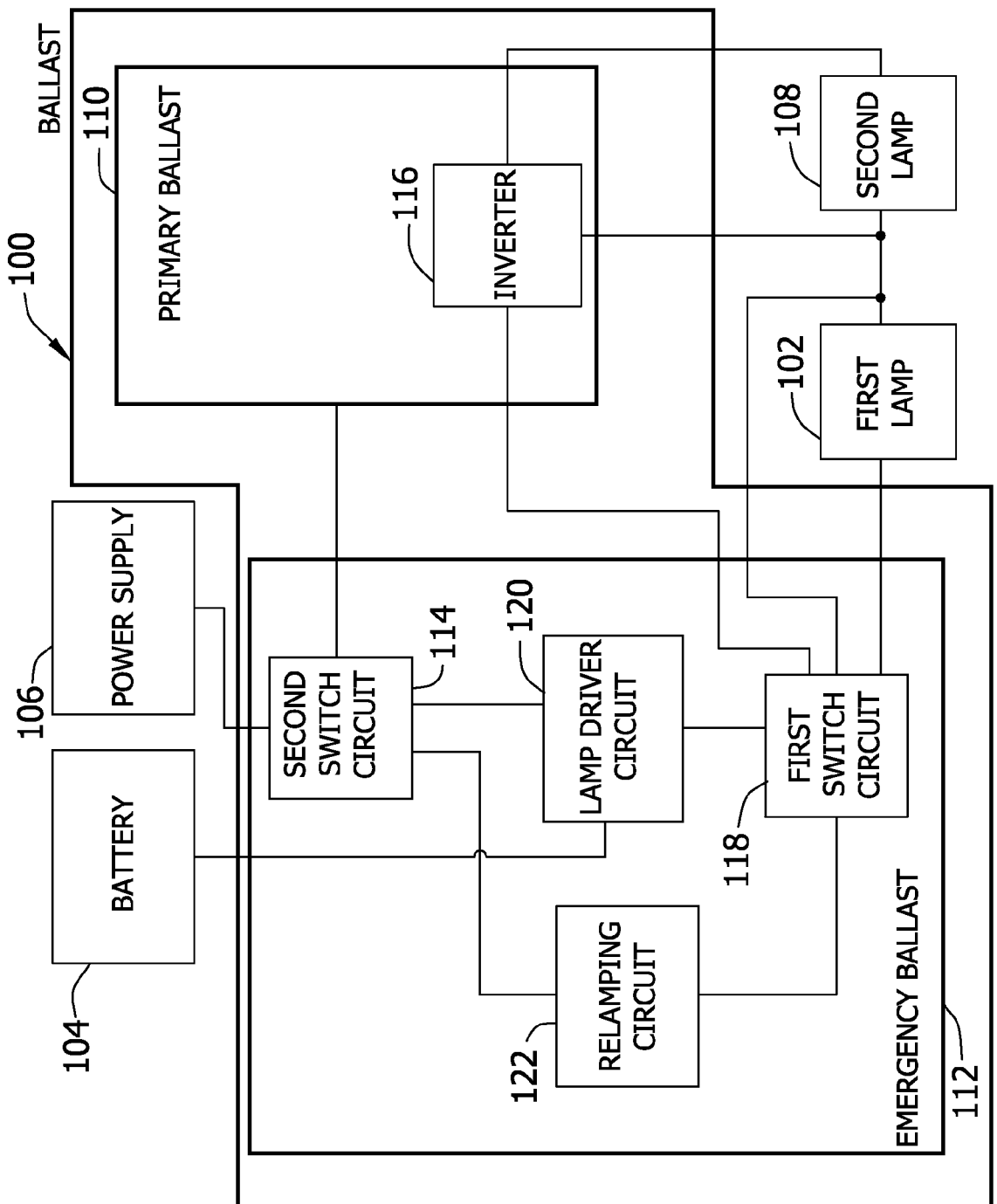
FIG. 1 is a block diagram of a ballast for receiving power from a battery and a power supply and for powering one or more lamps according to one embodiment of the invention.

Referring to FIG. 1, a ballast 100 powers a first lamp 102 from a battery 104 or power supply 106 according to one embodiment of the invention. The ballast includes a primary ballast 110 for providing power to the first lamp 102 from the power supply 106, and a battery powered ballast 112 for providing power to the first lamp 102 from the battery 104. In operation, when the power supply 106 is supplying power to the ballast 100, the ballast 100 powers the first lamp 102 and a second lamp 108. When the power supply 106 is not providing power to the ballast 100, the ballast 100 powers only the first lamp 102. In one embodiment, the power supply 106 is utility line power (e.g., 120 Vrms AC, 60 Hz).

When the power supply 106 is supplying power to the ballast 100, the power supply 106 energizes a first switch circuit 118, a second switch circuit 114, and the primary ballast 110. In one embodiment, the primary ballast 110 is a program start electronic ballast and rapid start electronic ballast. The second switch circuit 114 operably connects the power supply 106 to the primary ballast 110 and the power supply 106 energizes the primary ballast 110. An inverter 116 of the primary ballast 110 converts power from the power supply 106 into a relatively high voltage signal (e.g., 700-800 volts) having a frequency approximately equal to the resonant frequency of the lamps 102, 108. The first switch circuit 118 is energized via a relamping circuit 122 of the battery powered ballast 112 which places the first switch circuit 118 in a second state wherein the lamps 102, 108 are operably connected to the inverter 116 such that the inverter 116 can provide the high voltage signal to the lamps 102, 108. Thus, the ballast 100 is providing power to the lamps 102, 108 from the power supply 106.

When the power supply 106 ceases to provide power to the ballast 100 (e.g., in the event of a utility power outage), the second switch circuit 114 is de-energized, and defaults to a state wherein the power supply 106 is not operably connected to the primary ballast 110. The first switch circuit 118 is also de-energized and defaults to a first state wherein the lamp 102 is operably connected to a lamp driver circuit 120 of the battery powered ballast 112 and the lamp 102 is operably disconnected from the inverter 116 of the primary ballast 110. The lamp driver circuit 120 provides power from the battery 104 to the lamp 102 through the first switch circuit 118 at a voltage and frequency such that the lamp 102 gives off light. Thus, the ballast 100 provides power to the lamp 102 from the battery 104 when the power supply 106 is not providing power to the ballast 100.

A power restoration event occurs when the power supply 106 energizes the ballast 100 following a period during which the power supply 106 was not energizing the ballast 100. One example of a power restoration event is utility line power being restored following a power outage. In response to a power restoration event, the second switch circuit 114 is energized by the power supply 106, connecting the power supply 106 to the primary ballast 110 such that the power supply 106 also energizes the primary ballast 110. The first switch circuit 118 is also energized via the relamping circuit 122, placing the first switch circuit 118 in the second state and operably connecting the lamps 102, 108 to the inverter 116 of the primary ballast 110. The second switch circuit 114 disables the lamp driver circuit 120 of the battery powered ballast 112 in response to the power restoration event so that the lamp driver circuit 120 discontinues generating a high voltage signal from power from the battery 104.

Figure 2:
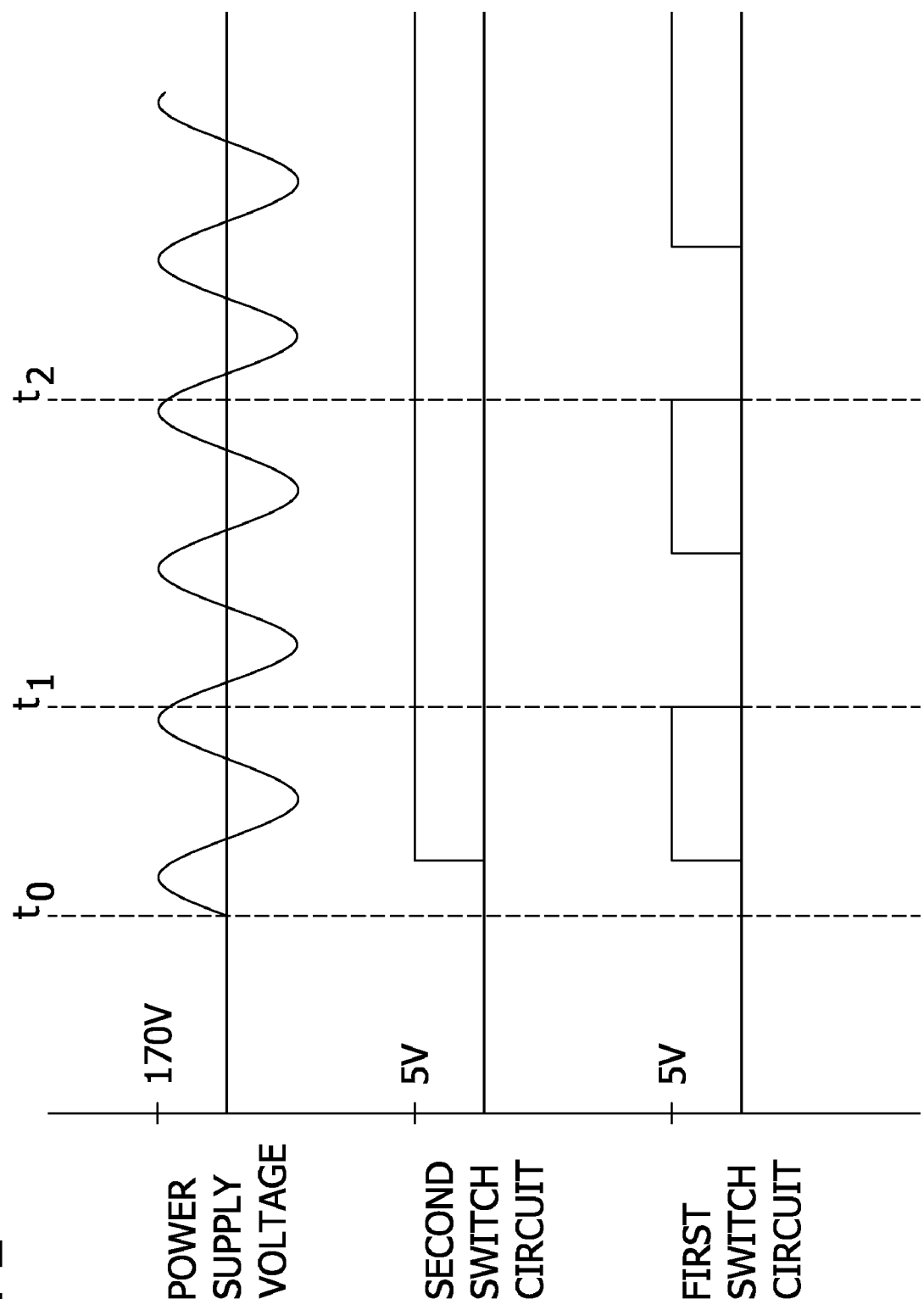
FIG. 2 is a timing diagram of voltages in a power supply, a first switch circuit, and a second switch circuit according to one embodiment of the invention.

Additionally, the relamping circuit 122 of the battery powered ballast 112 toggles the first switch circuit 118 between the second state and the first state of the first switch circuit 118 in response to the power restoration event. Referring to FIG. 2, before time $t_0$ the ballast 100 is powering the lamp 102 with power from the battery 104, and at time $t_0$, the power restoration event occurs. Thus, at time $t_0$, the second switch circuit 114 is energized and actuated by the power supply 106 after a nominal delay (due to capacitance in the ballast 100) as shown in FIG. 2. The first switch circuit 118 is also energized, placing the first switch circuit 118 in the second state after a nominal delay (due to capacitance in the ballast 100) as shown in FIG. 2. The first switch circuit 118 remains energized for 1 second, and at time $t_1$, the relamping circuit 122 toggles the first switch circuit 118. That is, the relamping circuit 122 de-energizes the first switch circuit 118 for 1 second, placing the first switch circuit in the first state, and then re-energizes the first switch circuit, returning the first switch circuit 118 to the second state. Generally, the effect of toggling the first switch circuit 118 is to electrically disconnect at least one lamp (e.g., lamp 102) from the primary ballast 110 to cause the primary ballast 110 to reset any protection circuits (e.g., an end of lamp life circuit) that detected a fault while transitioning the lamp 102 from power from the battery 102 to power from the power supply 106. It is also contemplated that the relamping circuit 122 may toggle the first switch circuit 118 in response to the initial application of power to the ballast 100 from the power supply 106 (i.e., that the initial application of power to the ballast 100 front the power supply 106 is a power restoration event).

In one embodiment of the invention, the first switch circuit 118 is toggled exactly once in response to a power restoration event, but in other embodiments of the invention, the relamping circuit 122 toggles the first switch circuit 118 at least twice as shown in FIG. 2. That is, at time $t_2$, the relamping circuit 122 de-energizes the first switch circuit 118, placing the first switch circuit 118 in the first state for 1 second, and re-energizes the first switch circuit 118 returning it to the second state thereafter. It is contemplated that in some embodiments of the invention, the relamping circuit 122 may place the first switch circuit 118 in a given state for a time period other than 1 second (e.g., 0.5 seconds or 2 seconds) when toggling the first switch circuit 118.

One skilled in the art will recognize that the second switch circuit 114 and the first switch circuit 118 may be configured in a variety of alternative ways. For example, in one embodiment, the first switch circuit 118 connects lamp 102 to the lamp driver circuit 120 when it is energized and connects lamps 102, 108 to the inverter 116 of the primary ballast 110 when it is de-energized. Similarly, in one embodiment, the second switch circuit 114 connects the power supply 106 to the primary ballast 110 when it is de-energized, and enables the lamp driver circuit 120 when it is energized. The first and second switch circuits 114, 118 may also be energized with any voltage signal. For example, the first and second switch circuits 114, 118 may be actuated by 3, 5, or 12 volts DC, or 120 Vrms AC, and the two switch circuits may be actuated by different voltage signals. Additionally, the ballast 100 may be configured to only power one lamp 102, regardless of whether the ballast 100 is providing power from the power supply 106 or the battery 104. Conversely, the ballast 100 may be configured to power both lamps 102, 108 regardless of the source of the power.

Figure 3:
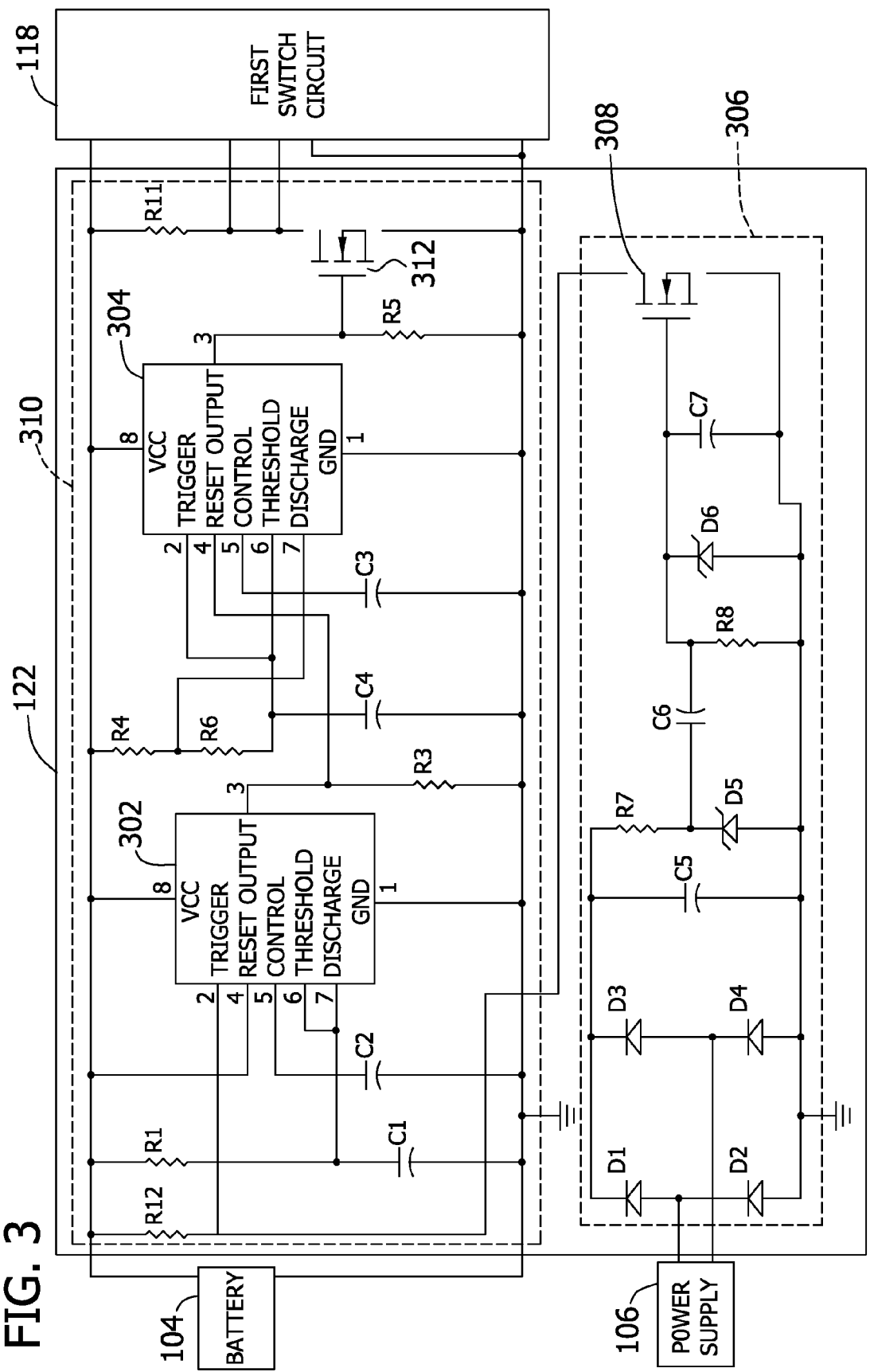
FIG. 3 is a schematic diagram of a relamping circuit for use with the ballast of FIG. 1 according to one embodiment of the invention.

Referring to FIG. 3, one embodiment of the relamping circuit 122 is shown. The power supply 106 energizes the relamping circuit 122 with a 120 Vrms, 60 Hz power signal. The relamping circuit 122 includes a clock 306 for receiving the power signal and providing a clock signal. The clock 306 includes a half wave rectifier driving a transistor 308 which produces the clock signal. A timer circuit 310 receives the clock signal and provides a two pulse waveform. The timer circuit 310 includes a first timer 302 for receiving the clock signal and driving a second timer 304 for providing the two pulse waveform. In one embodiment, the first timer 302 is a monostable 555 timer, and the second timer 304 is an astable 555 timer. In another embodiment of the invention, the timer circuit 310 comprises a 556 timer dual monostable multivibrator for generating the 2 pulse waveform. The two pulse waveform is provided to a transistor 312 which interrupts power to the first switch circuit 118 in order to toggle it between the second state and the first state.

Figure 4:
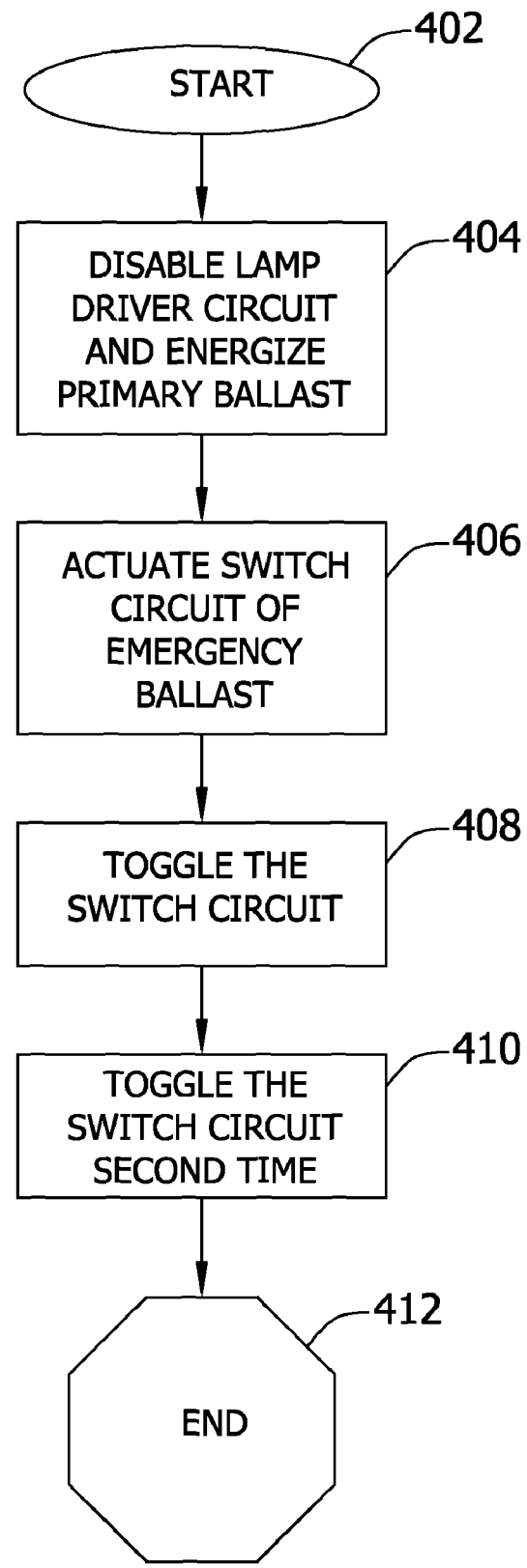
FIG. 4 is a flow chart of a method for transitioning a lamp from power from a battery to power from a power supply according to one embodiment of the invention.

Referring to FIG. 4, a method of transitioning a lamp from power from a battery to power from a power supply is shown according to one embodiment of the invention. The method begins at 402 in response to a power restoration event, and at 404, a lamp driver circuit of an battery powered ballast is disabled and a primary ballast is energized. At 406, a switch circuit (e.g., first switch circuit 118) is actuated, and the switch circuit is toggled at 408. At 410, the switch circuit is toggled a second time and the method ends at 412 with the lamp being powered with power from the power supply.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. An battery powered ballast for use in combination with a primary ballast, said primary ballast powering a lamp when operably connected to and energized by a power supply, said battery powered ballast for use with a battery and for powering the lamp when the primary ballast is not energized by the power supply, said battery powered ballast comprising:
   a lamp driver circuit for supplying power to the lamp from the battery when said lamp driver circuit is enabled;
   a first switch circuit for selectively connecting the lamp to the lamp driver circuit or the primary ballast;
   a second switch circuit connected to the power supply for connecting the primary ballast to the power supply when the power supply is energizing the second switch circuit such that the primary ballast is energized by the power supply, and for enabling the lamp driver circuit when the power supply is not energizing the second switch circuit; and
   a relamping circuit for toggling the first switch circuit in response to a power restoration event comprising the power supply energizing the second switch circuit after a period during which the second switch circuit was not energized by the power supply.

2. The battery powered ballast of claim 1 wherein the second switch circuit enables the lamp driver circuit by connecting the lamp driver circuit to the battery.

3. The battery powered ballast of claim 1 wherein the second switch circuit enables the lamp driver circuit by providing an enable signal to a controller for controlling the lamp driver circuit.

4. The battery powered ballast of claim 1 wherein the relamping circuit toggles the first switch circuit at least twice in response to the power restoration event.

5. The battery powered ballast of claim 4 wherein toggling the first switch circuit comprises placing the first switch circuit in a first state for about 1 second and a second state for about 1 second.

6. The battery powered ballast of claim 5 wherein:
   the first switch circuit operably connects the lamp to the lamp driver circuit when the first switch circuit is in the first state; and
   the first switch circuit operably connects the lamp to the primary ballast when the first switch circuit is in the second state.

7. The battery powered ballast of claim 1 further comprising a second lamp powered by the primary ballast wherein:
   the first switch circuit and the lamp driver circuit are configured to supply power to the lamp when the power supply is not energizing the second switch circuit; and
   the first switch circuit and the primary ballast are configured to supply power to both lamps when the power supply is energizing the second switch circuit.

8. The battery powered ballast of claim 1 wherein the relamping circuit toggles the first switch circuit in response to a power restoration event to reset an end of lamp life circuit of the primary ballast.

9. A method of transitioning a lamp from power from a battery to power from a power supply in response to a power restoration event, said power restoration event comprising the power supply energizing a primary ballast after a period during which the primary ballast was not energized by the power supply, said method comprising:
- disabling a lamp driver circuit of an battery powered ballast in response to the power restoration event, said battery powered ballast supplying power to the lamp from the battery;
- actuating a switch circuit of the battery powered ballast from a first state to a second state in response to the power restoration event, wherein the lamp is operably connected to the primary ballast when the switch circuit is in the second state, said primary ballast supplying power to the lamp from the power supply when the primary ballast is energized by the power supply; and
- toggling the switch circuit between the second state and the first state in response to the power restoration event.

10. The method of claim 9 wherein the lamp is operably connected to the lamp driver circuit of the battery powered ballast when the switch circuit is in the first state.

11. The method of claim 9 wherein toggling the switch circuit comprises placing the switch circuit in the first state and returning the switch circuit to the second state.

12. The method of claim 11 wherein the switch circuit is placed in the first state for about 1 second and returned to the second state for about 1 second.

13. The method of claim 9 further comprising toggling the switch circuit a second time in response to the power restoration event.

14. The method of claim 9 wherein the primary ballast and the switch circuit operate to provide power to the lamp and an additional lamp from the power supply when the power supply is energizing the primary ballast, and wherein the lamp driver circuit of the battery powered ballast and the switch circuit operate to provide power to the lamp from the battery when the power supply is not energizing the primary ballast.

15. The method of claim 9 wherein toggling the switch circuit resets an end of lamp life circuit of the primary ballast.

16. A lamp ballast for providing power to a lamp comprising:
- a primary ballast for providing power from a power supply to the lamp when operably connected to and energized by a power supply; and
- an battery powered ballast for providing power from a battery to the lamp when the primary ballast is not energized by the power supply, said battery powered ballast comprising:
  - a lamp driver circuit for supplying power to the lamp from the battery when said lamp driver circuit is enabled;
  - a first switch circuit for selectively connecting the lamp to the lamp driver circuit or the primary ballast;
  - a second switch circuit for connected to the power supply for connecting the primary ballast to the power supply when the power supply is energizing the second switch circuit such that the primary ballast is energized by the power supply, and for enabling the lamp driver circuit when the power supply is not energizing the second switch circuit; and
  - a relamping circuit for toggling the first switch circuit in response to a power restoration event comprising the power supply energizing the second switch circuit after a period during which the second switch circuit was not energized by the power supply.

17. The lamp ballast of claim 16 wherein the second switch circuit enables the lamp driver circuit by operably connecting the lamp driver circuit to the battery.

18. The lamp ballast of claim 16 wherein the second switch circuit enables the lamp driver circuit by providing an enable signal to a controller for controlling the lamp driver circuit.

19. The lamp ballast of claim 16 wherein:
- the relamping circuit toggles the first switch circuit at least two times in response to the power restoration event;
- the relamping circuit toggles the first switch circuit by placing the first switch circuit in a first state for about 1 second and a second state for about 1 second;
- the first switch circuit operably connects the lamp to the lamp driver circuit in the first state of the first switch circuit; and
- the first switch circuit operably connects the lamp to the primary ballast in the second state of the first switch circuit.

20. The lamp ballast of claim 16 wherein:
- the first switch circuit and the lamp driver circuit are configured to supply power to the lamp when the power supply is not energizing the second switch circuit; and
- the first switch circuit and the primary ballast are configured to supply power to the lamp and an additional lamp when the power supply is energizing the second switch circuit.

21. The lamp ballast of claim 1 wherein the relamping circuit toggles the first switch circuit in response to a power restoration event to reset an end of lamp life circuit of the primary ballast.

\* \* \* \* \*